(12) United States Patent
Hill

(10) Patent No.: US 8,145,573 B2
(45) Date of Patent: Mar. 27, 2012

(54) CONDUCTING FINANCIAL TRANSACTIONS

(75) Inventor: Rosemary Hill, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 220 days.

(21) Appl. No.: 11/873,485

(22) Filed: Oct. 17, 2007

(65) Prior Publication Data

US 2009/0106158 A1   Apr. 23, 2009

(51) Int. Cl.
*H04L 1/00* (2006.01)
(52) U.S. Cl. .......................................... 705/65
(58) Field of Classification Search ............... 705/65
See application file for complete search history.

(56) References Cited

U.S. PATENT DOCUMENTS

| | | | |
|---|---|---|---|
| 4,847,803 A * | 7/1989 | Miyano | 235/382 |
| 5,953,710 A * | 9/1999 | Fleming | 705/38 |
| 7,512,566 B1 * | 3/2009 | Fellner | 705/67 |
| 2001/0001856 A1* | 5/2001 | Gould et al. | 705/39 |
| 2001/0049630 A1* | 12/2001 | Justice | 705/26 |
| 2002/0133708 A1* | 9/2002 | Gudorf et al. | 713/186 |
| 2004/0143527 A1* | 7/2004 | Benkert et al. | 705/35 |
| 2007/0005514 A1* | 1/2007 | Fieschi et al. | 705/72 |
| 2007/0055622 A1* | 3/2007 | Martin | 705/38 |
| 2007/0299742 A1* | 12/2007 | Williams et al. | 705/26 |
| 2008/0238610 A1* | 10/2008 | Rosenberg | 340/5.7 |

FOREIGN PATENT DOCUMENTS

| | | |
|---|---|---|
| WO | 2004/095228 A2 | 11/2004 |
| WO | 2007/011695 A2 | 1/2007 |

OTHER PUBLICATIONS

International Search Report and Written Opinion for International Application No. PCT/US2008/080311, mailed Mar. 27, 2009, 16 pages.

* cited by examiner

*Primary Examiner* — Calvin L Hewitt, II
*Assistant Examiner* — Zeshan Qayyum
(74) *Attorney, Agent, or Firm* — Banner & Witcoff, Ltd.; Michael A. Springs

(57) ABSTRACT

A payment device such as a debit card may be issued to an individual such as a minor. The debit card may be associated with spending control parameters to prevent overspending and other financial issues. Control parameters may include a weekly maximum that may be spent, approved transaction types (e.g., deposits only), authorized transaction entities (e.g., grocery stores, gas stations, etc.). Thus, transaction might only be approved if the transaction qualifies under the set control parameters. An individual may further access a banking interface that allows the individual to view financial education materials, games, savings trackers and the like. A savings tracker may be used to help an individual save money toward a particular goal. In one or more configurations, a parent, guardian or primary account holder may have the ability to modify control settings of the payment device and/or modify the banking interface (e.g., change the options available).

7 Claims, 8 Drawing Sheets

CONDUCTING FINANCIAL TRANSACTIONS

BACKGROUND

Credit cards, debit cards and other types of payment devices are quickly replacing traditional methods of payment including cash and check. For many, the convenience of carrying a single card that provides access to needed funds outweighs any of the advantages of carrying cash or a checkbook. However, under current industry regulations, many individuals such as minors are not permitted to have payment devices such as debit cards. One concern that has led to such regulations is the fear that a minor will frequently overspend or overdraw his or her account. Thus, parents and/or guardians of such individuals often need to withdraw cash from their accounts so that the individuals may make a purchase or conduct some other financial transaction. Alternatively, the parents or guardians may need to make the desired transaction themselves for the individuals. Cash or gift cards are another option but are susceptible to loss (i.e., if the cash or gift card is lost, the funds are also lost).

SUMMARY

Aspects described herein relate to systems, methods and apparatuses for establishing and enforcing spending controls associated with a payment device such as a debit card. A debit card may be issued to an individual such as a minor with control parameters associated therewith. A parent or guardian or the individual may set various control parameters including spending limits, authorized types of use, limitations on times of use and the like. Thus, a minor, for example, may independently make transactions without fear of exceeding account limits, spending too much and/or buying unnecessary items. Such a payment device may be issued by creating a new payment device number (e.g., a bank identification number) and linking the payment device number to an existing account. For example, a minor may be able to link a debit card to a savings account or other funding account. During establishment and creation of the payment device, controls may be set. In one or more arrangements, a PIN different from the minor or account holder's PIN may also be established for a parent or guardian. The PIN may provide the parent or guardian with a higher degree of access to the linked account. In one example, entering the parent or guardian PIN may allow the parent or guardian to circumvent the spending restrictions.

According to one or more aspects, transactions using a payment device may be processed by comparing the transaction parameters to one or more control parameters. For example, a transaction amount may be compared to a spending limit and/or an account balance. In another example, a transaction party may be compared to a list of authorized parties. Various other comparisons may also be made depending on the controls settings associated with the payment device. Once the transaction is authorized, funds may be appropriately transferred.

According to one or more further aspects, a banking interface associated with a payment device having control parameters set therewith may include various financial assistance tools such as educational tools, games, goal tracker and the like. Educational tools and games may help an individual such as a minor learn about fiscal responsibility. A goal tracker may also be included in the banking interface to help an individual reach a particular goal. For example, if a high school student is saving up for a car, the goal tracker may help with planning financial activities and parameters for reaching that goal. The interface may further be customizable. In one or more configurations, a parent or guardian responsible for setting control parameters may access the banking interface as well. The banking interface may be the same as or different from the interface that is displayed to the account holder. In one instance, a parent or guardian may access options (e.g., control settings) in a banking interface that are not available to the account holder. A parent or guardian may also alter the settings of the interface displayed for the account holder.

According to one or more additional aspects, a payment device may also include identification information so that the device may be used as identification. The identification information may be visible on its face or may be stored in a non-visible manner (i.e., on a magnetic strip or in another storage medium). The photo identification may also include restrictions or controls such that the identification is only valid if certain specified conditions are met.

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The foregoing summary of the claimed subject matter, as well as the following detailed description of illustrative embodiments, is better understood when read in conjunction with the accompanying drawings, which are included by way of example, and not by way of limitation with regard to the claimed subject matter.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
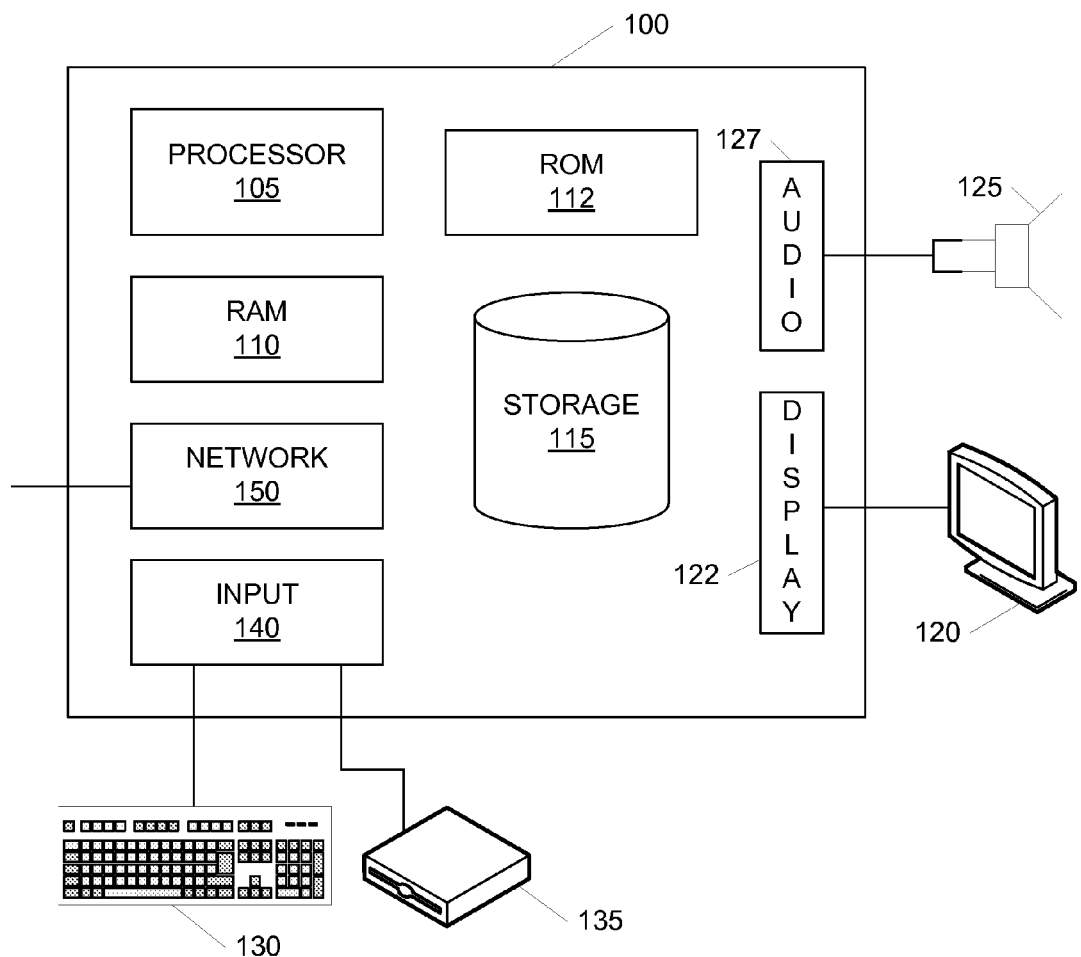
FIG. 1 illustrates a computing environment in which one or more aspects described herein may be implemented.

FIG. 1 illustrates a computing environment in which one or more aspects described herein may be implemented. A computing device such as computer 100 may house a variety of components for inputting, outputting, storing and processing data. For example, processor 105 may perform a variety of tasks including executing one or more applications, retrieving data from a storage device such as storage 115 and/or outputting data to a device such as display 120. Processor 105 may be connected to Random Access Memory (RAM) module 110 in which application data and/or instructions may be temporarily stored. RAM module 110 may be stored and accessed in any order, providing equal accessibility to the storage locations in RAM module 110. Computer 100 may further include Read Only Memory (ROM) 112 which allows data stored thereon to persist or survive after computer 100 has been turned off. ROM 112 may be used for a variety of purposes including for storage of computer 100's Basic Input/Output System (BIOS). ROM 112 may further store date and time information so that the information persists even through shut downs and reboots. In addition, storage 115 may provide long term storage for a variety of data including applications and data files. Storage 115 may include any of a variety of computer readable mediums such as disc drives, optical storage mediums, magnetic tape storage systems, flash memory and the like. In one example, processor 105 may retrieve an application from storage 115 and temporarily store the instructions associated with the application RAM module 110 while the application is executing.

Computer 100 may output data through a variety of components and devices. As mentioned above, one such output device may be display 120. Another output device may include an audio output device such as speaker 125. Each output device 120 and 125 may be associated with an output adapter such as display adapter 122 and audio adapter 127, which translates processor instructions into corresponding audio and video signals. In addition to output systems, computer 100 may receive and/or accept input from a variety of input devices such as keyboard 130, storage media drive 135 and/or microphone (not shown). As with output devices 120 and 125, each of the input devices 130 and 135 may be associated with an adapter 140 for converting the input into computer readable/recognizable data. In one example, voice input received through microphone (not shown) may be converted into a digital format and stored in a data file. In another example, credit card input may be received through a card reader (not shown) and converted into a digital format. In one or more instances, a device such as media drive 135 may act as both an input and output device allowing users to both write and read data to and from the storage media (e.g., DVD-R, CD-RW, etc.).

Computer 100 may further include one or more communication components for receiving and transmitting data over a network. Various types of networks include cellular networks, digital broadcast networks, Internet Protocol (IP) networks and the like. Computer 100 may include adapters suited to communicate through one or more of these networks. In particular, computer 100 may include network adapter 150 for communication with one or more other computer or computing devices over an IP network. In one example, adapter 150 may facilitate transmission of data such as electronic mail messages and/or financial data over a company or organization's network. In another example, adapter 150 may facilitate transmission or receipt of information from a world wide network such as the Internet. Adapter 150 may include one or more sets of instructions relating to one or more networking protocols. For example adapter 150 may include a first set of instructions for processing IP network packets as well as a second set of instructions associated with processing cellular network packets. In one or more arrangements, network adapter 150 may provide wireless network access for computer 100.

One of skill in the art will appreciate that computing devices such as computer 100 may include a variety of other components and is not limited to the devices and systems described in FIG. 1.

Figure 2:
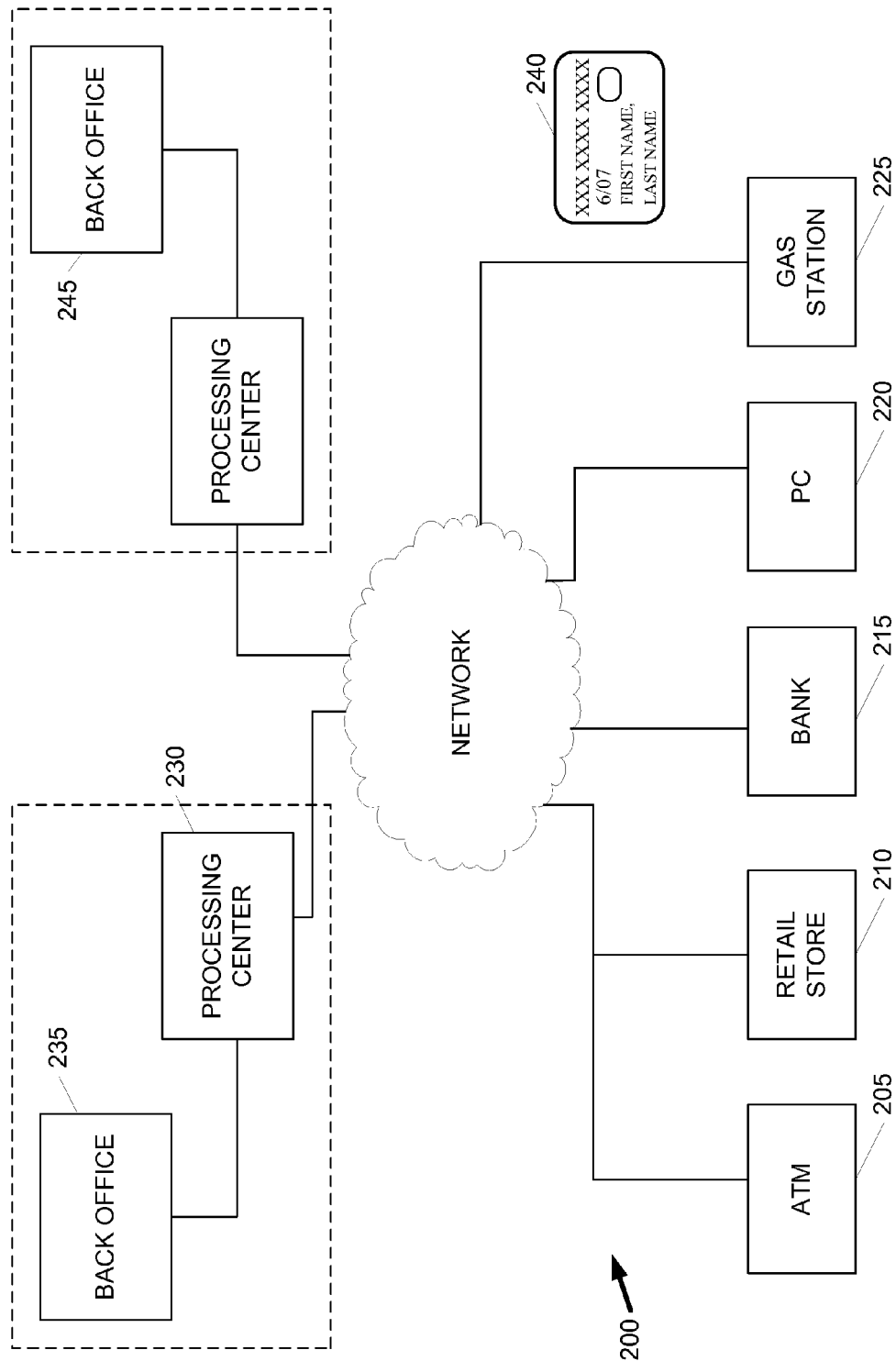
FIG. 2 illustrates a transaction processing environment according to one or more aspects described herein.

Computer 100 of FIG. 1 may be incorporated into a variety of transaction processing systems for authorizing and completing requested transaction. Further, transaction processing may be facilitated through any number of networks including merchant networks (e.g., VISANET/PLUS/INTERLINK). FIG. 2 illustrates a transaction processing environment in which an individual may perform transactions at a variety of different locations. For example, environment 200 includes multiple transaction sites including automated teller machine (ATM) 205, retail store 210, bank 215, home computer 220 and gas station 225. Transaction sites may include a variety of other locations and is not limited to the locations illustrated in FIG. 2. An individual may perform a transaction at each of these locations using a payment device, e.g., payment card 240. Payment devices may include credit cards, debit cards, RFID devices, mobile communication devices such as cell phones and/or combinations thereof. In one or more configurations, a payment device may be mobile so that the payment device may be carried to and used at different locations. Each of the transaction sites 205, 210, 215, 220 and 225 may be connected through a network such as the Internet to a transaction processing center such as processing center 230. Transaction processing center 230 may be located at a bank or other entity with which the transaction is associated. For example, if an individual pays for gas using a debit card issued by Bank A, a transaction request may be sent to a transaction processing center (e.g., center 230) associated with Bank A. The transaction processing center 230 may be responsible for handling multiple activities including authorizing transactions (e.g., a withdrawal, payment, deposit, credit), detecting fraud, issuing payment devices such as credit cards and debit cards, activating payment devices and/or determining and issuing rewards.

Transaction processing environment 200 may further include a processing back office such as back office 235. Back office 235 may be responsible for performing a variety of tasks including settlement, exception processing, transaction research, fraud detection, reporting and/or accounting. Some tasks performed by back office 235 may overlap with one or more other systems (e.g., processing center 230) in the event the other systems are unable to perform the task and/or additional information is needed. For example, if processing center 230 is unable to obtain all the information needed to make a fraud decision, the fraud processing may be passed to back office 235. Settlement may include obtaining or transferring funds to one or more entities or accounts depending on the type of transaction. Reporting may include generating a statement for the transaction and/or notifying the individual requesting the transaction about the details of the completed transactions. Further, accounting may include updating and balancing the bank's or other entity's accounting records.

According to one or more aspects, back office 235 may be connected to one or more other back offices, e.g. back office 245, for settling or reconciling a transaction. In one example, transaction processing center 230 may initially authorize a purchase transaction based on a purchase amount and the amount of funds available in an associated bank account. Once authorized, the transaction may be passed to back office 235 for settlement and reconciliation. That is, the transaction may be submitted to back office 235 for transferring the payment amount to a destination bank or other entity associated with the payee, e.g., back office 245. In one example, back office 245 may associated with a bank of the payee.

Due to the perceived lack of maturity of minors (e.g., individuals under the age of 18), current issuers of debit and credit cards (and other payment devices) generally do not issue debit and/or credit cards to minors. However, debit cards, credit cards and other payment devices are often convenient and present less risk of monetary loss than carrying paper money or coins. Further, different individuals often exhibit different levels of maturity. As such, some minors may be ready to handle the responsibility associated with credit or debit cards but would not be allowed to do so under current typical card issuing practice.

According to one or more aspects, payment devices such as debit cards may be issued to minors. The debit card may be tied to or otherwise associated with a funding account such as a savings or checking account. The payment devices may further include one or more controls such as spending limits, use restrictions, account limits or restrictions and the like. Additionally, on-line banking may be customized for interaction by minors. For example, on-line banking sites may include educational tools and information to encourage fiscal responsibility and sensible spending. Further, banking sites or interfaces may display a timeline and/or a plan for saving toward a goal specified by the minor (e.g., a bike or a car).

Additionally or alternatively, the payment device may further include identification information such as a photo, fingerprint data, age, address, description and the like. The information may be displayed on the payment device or embedded as stored data. Accordingly, the payment device may also be used or act as identification. In one or more arrangements, payment device controls may also be applied to identification information stored thereon. That is, controls may be set to define circumstances under which identification information stored on the payment device may be used to authenticate identity or may be considered valid. For example, a payment device storing identification information may be considered valid ID at the movies but not for purchasing goods (e.g., alcohol or cigarettes).

Figure 3:
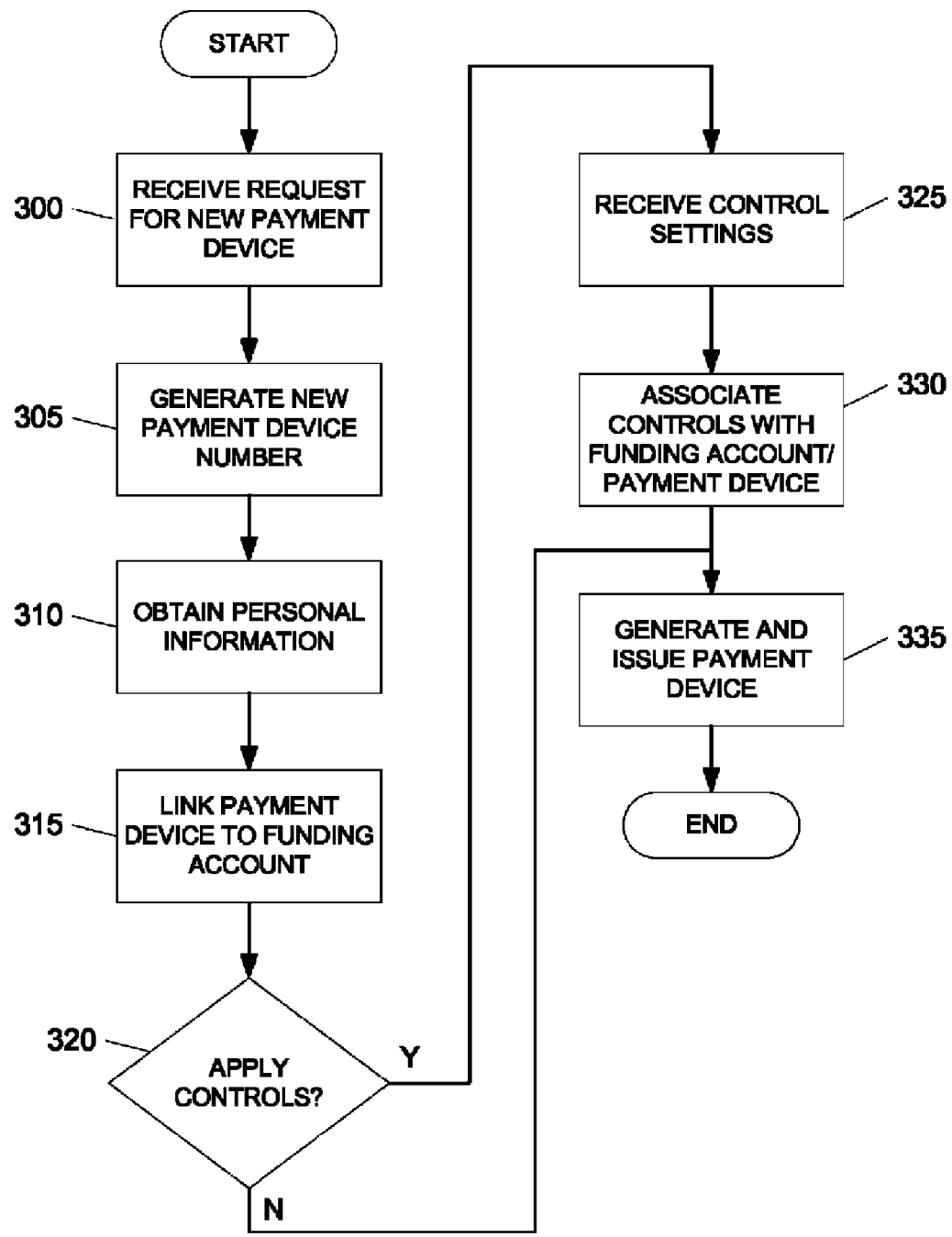
FIG. 3 is a flowchart illustrating a method for establishing a payment device according to one or more aspects described herein.

FIG. 3 is a flowchart illustrating a method for establishing a payment device for a minor. In step 300, a banking institution or other payment device issuer may receive a request for a new payment device such as a credit card or a debit card. The request may originate from, for example, a minor or a parent or guardian of the minor. In response to the request, the banking institution may generate a new payment device number (e.g., debit card number, bank identification number) in step 305. Additionally, the banking institution may also establish or obtain personal information associated with the new payment device in step 310. Personal information may include personal identification number (PIN) information, card/account relationships and/or name/address/phone information. This information may be stored physically on the payment device (e.g., on a magnetic strip or in an RFID chip) or may be stored in a server and linked to the device number or both. In one or more configurations, a PIN for a parent or guardian may also be established to allow access to additional or different functionality. For example, by entering a different PIN than the minor or individual to which the payment device belongs, a parent or guardian may access an interface for modifying the controls associated with the payment device. In step 315, the banking institution may link the payment device and/or payment device number to a banking or credit account. For example, a debit card number may be linked to a minor's savings account to identify the account from which funds are to be drawn and deposited.

In step 320, the banking institution may determine whether one or more controls should be applied to the card. The determination may be made automatically or based on a preference of the requesting party. In one example, if a debit card is being established for a minor, controls may be required. Alternatively, controls may be optional. If controls are required or desired, control settings may be received in step 325 and associated with the payment device number and/or account number in step 330. For example, a parent may wish to set spending limits for his or her child. The spending limits may include time of use restrictions and/or amount limitations. The control settings may be stored in a database or embedded in a storage medium of the payment device (e.g., a magnetic strip or RFID chip). In step 335, the payment device may be generated and issued to the minor or parent or guardian.

Figure 4:
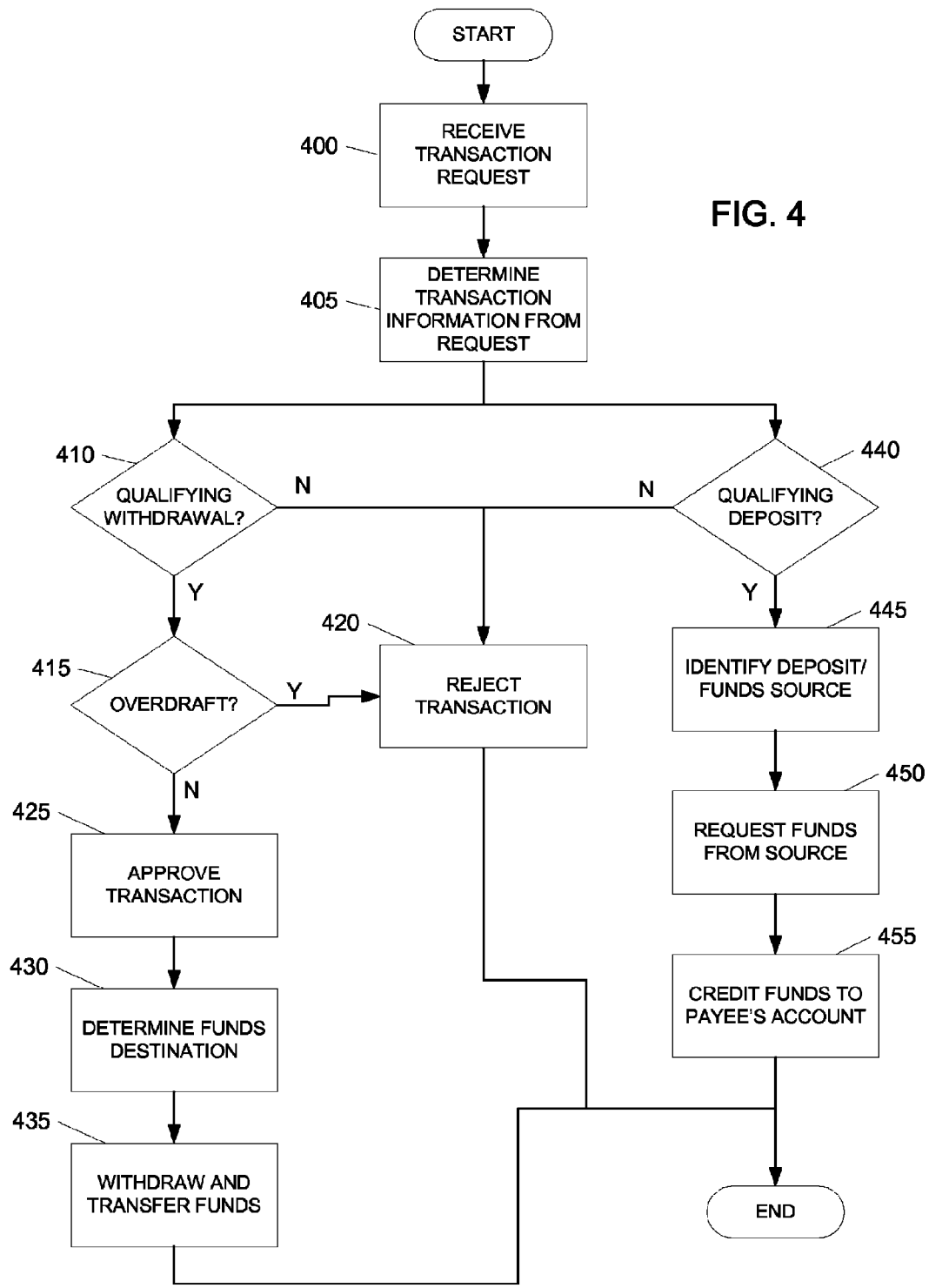
FIG. 4 is a flowchart illustrating a method for processing a transaction according to one or more aspects described herein.

Once a payment device has been issued to an intended user such as a minor, the user may begin making transactions with the device. FIG. 4 is a flowchart illustrating a method for processing a transaction. In step 400, a transaction processing center may receive a transaction request from a transaction site such as an ATM, a gas station, a retail store or the like. Upon receiving the transaction request, the transaction processing center may determine a user's account associated with the transaction request, a type of transaction and an amount associated with the transaction in step 405. In one example, an account may be identified based on a payment device number included in the request while the type of transaction and the amount may be included in the request. Types of transactions may include withdrawals and deposits. Withdrawals may include purchase transactions as well as cash withdrawal transactions (e.g., at ATMs) while deposits may include sales payments, credits (e.g., for a return) and/or cash/check deposits.

If the transaction corresponds to a withdrawal, the processing center may determine whether one or more parameters of the requested transaction qualifies under one or more withdrawal control settings associated with the account in step 410. For example, the processing center may evaluate whether the withdrawal amount is below a predefined daily limit. In another example, the processing center may determine whether the withdrawal is for payment to an authorized entity or group of entities (e.g., grocery stores, convenience stores). If the transaction qualifies under the control settings, the processing center may subsequently determine, in step 415, whether an account limit will be exceeded if the specified transaction amount is withdrawn (i.e., whether the transaction amount is greater than the account balance). If the account limit will be exceeded or if the transaction does not qualify under the control settings, the transaction may be denied in step 420. In step 425, if the account limit will not be exceeded and the transaction qualifies under the control settings, the processing center may approve the transaction request. A withdrawal or funds destination may then be identified in step 430. That is, the processing center may determine a destination entity and/or location to which withdrawn funds are to be sent. If, for example, a user is making an ATM withdrawal, the processing center may identify an entity or account associated with the ATM to which the funds should be sent. On the other hand, if the user is purchasing groceries, the processing center may determine a company and/or company account to which to send payment. The destination entity and/or location may be identified in the transaction request. For example, an ATM or a retail store may include account information for the ATM or retail store to the processing center. In step 435, the requested amount of funds may be withdrawn from the account and transferred to the destination entity and/or location (e.g., an account).

If the transaction corresponds to a deposit, the processing center may determine whether one or more deposit parameters qualify under one or more deposit control settings in step 440. In one or more configurations, this step may be optional if no deposit control settings exist. If the deposit parameters qualify, a deposit or funding source may be identified in step 445. For example, if a user is depositing money at an ATM, the source may be identified as the ATM machine or an account associated therewith. Alternatively, if a user is being paid by another entity, the processing center may identify an account associated with the paying entity. In step 450, the processing center may request the transaction amount of funds from the payee or a banking institution associated therewith. Further, in step 455, the processing center may credit the transaction amount to the user's account. In one or more arrangements, a temporary credit may be applied to a user's account until the transaction amount is received from the payee.

Figure 5:
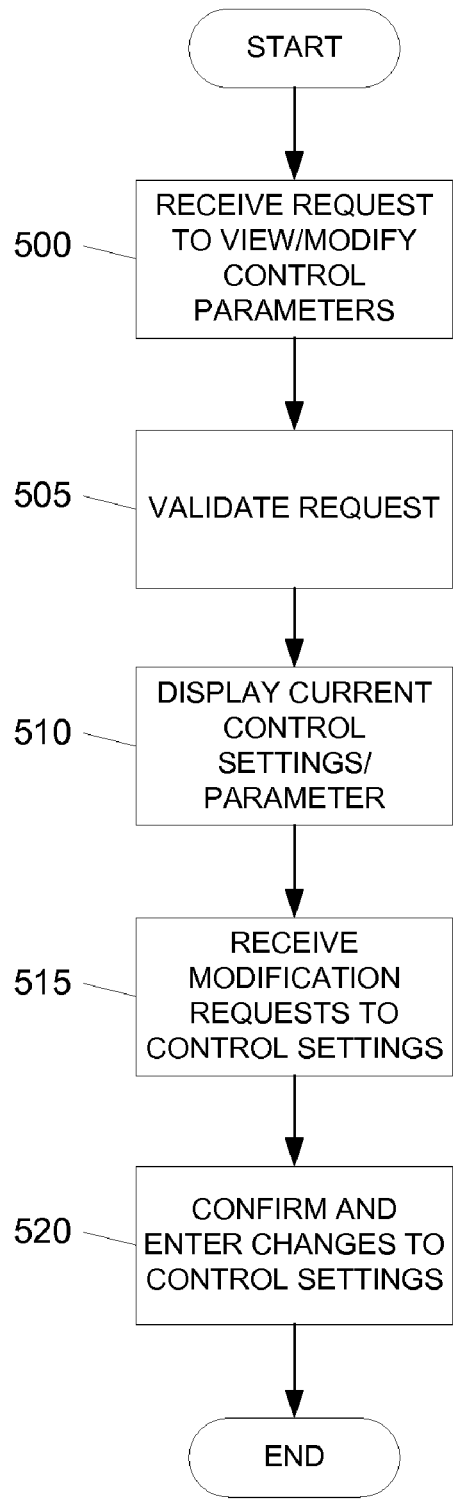
FIG. 5 is a flowchart illustrating a method for setting and modifying control parameters according to one or more aspects described herein.

FIG. 5 illustrates a flowchart illustrating a method for setting or modifying control parameters for a payment device such as a debit card issued to a minor. In step 500, a control system may receive a request to view or modify control parameters associated with a payment device number. For example, a user may log on to a website using a username and password previously registered with the payment device number and/or an account associated with the payment device (e.g., a savings account linked to a debit card). In step 505, the control system may validate the request. For example, the control system may verify the login information is valid. In step 510, the control system may display current control settings to the user along with modification options. In step 515, the control system may receive one or more modification requests to the control settings. In response to the modification requests, the control system may confirm and enter the changes in step 520. For example, the control system may enter the changes by saving the control settings in association with the payment device and/or the account associated with the payment device. Old control settings may be overwritten or removed. Controls may be changed (e.g., added/removed) at any time by an authorized user. For instance, if a child is grounded, a parent may restrict the use of the child's debit card to a certain amount or may restrict use of the card entirely.

Figure 6:
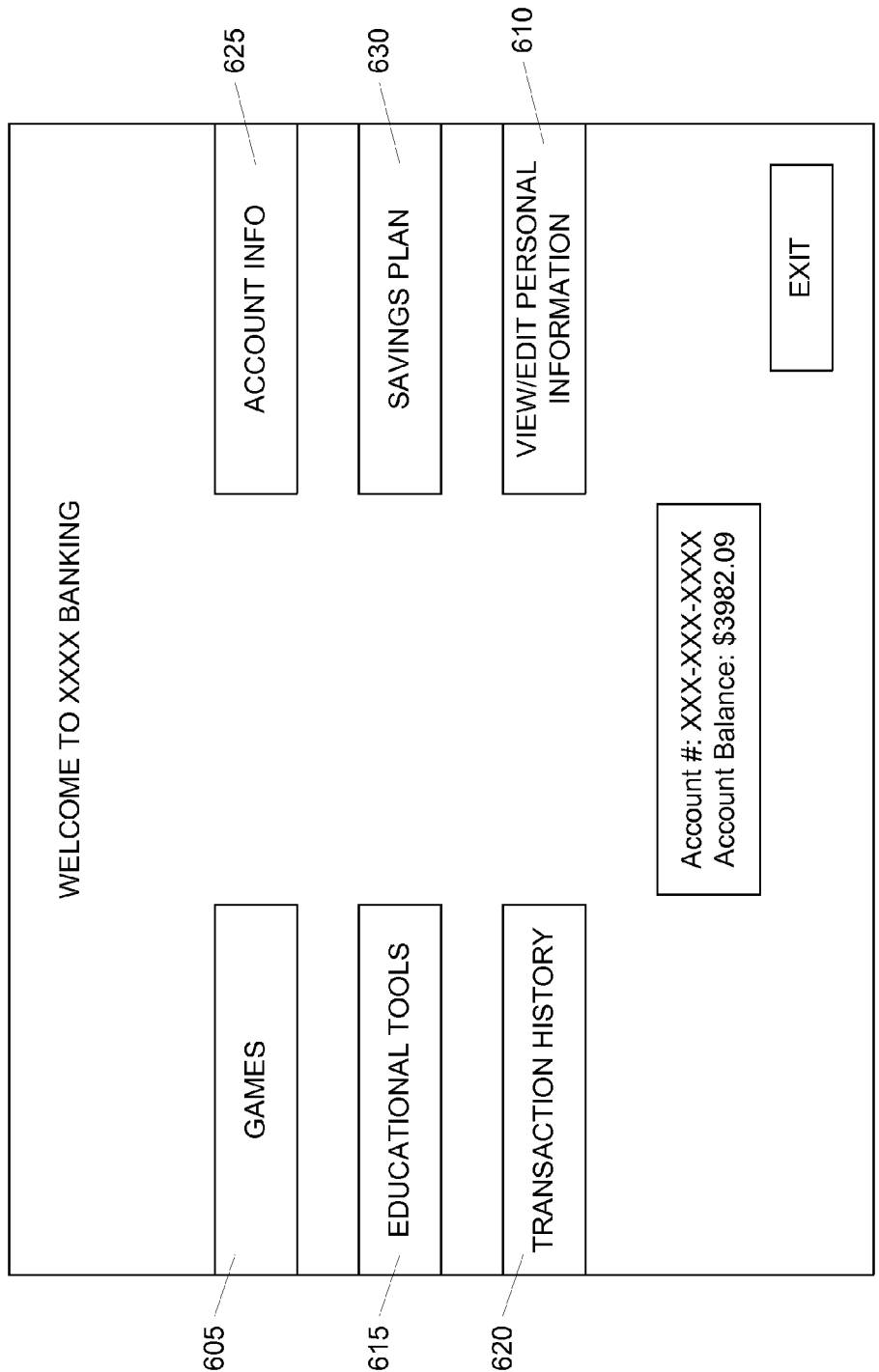
FIG. 6 illustrates a banking interface according to one or more aspects described herein.

FIG. 6 illustrates a banking interface that may be displayed to a minor or other individual having a payment device subject to spending controls. Banking interface 600 includes a variety of options such as games 605, view/edit personal information 610, educational tools 615, transaction history 620, account information 625 and savings plan 630. Games 605 and educational tools 615 may both relate to interactive programs or applications designed to entertain and/or educate the account holder. Games 605 may be directed more to the entertainment side while educational tools 615 may be directed more toward financial learning. Transaction history option 620 may be used to access a history of transactions made by the account holder. View/edit personal information option 610 may allow an account holder to view and edit information about him or herself such as address, e-mail, phone number and the like. Account information option 625, when accessed, may display a listing of the current settings and parameters of the account. For example, the account information may show the type of account (e.g., debit, credit), an account number to which the payment device is linked, control settings and/or balance information. Savings plan option 630, on the other hand, may be used to track an account holder's savings. The tracking may be depicted using a timeline. An account holder may further set a goal for his or her savings and solicit planning hints from the banking system. For example, a banking system may calculate the amount of money an account holder would have to save on a weekly or monthly basis to purchase a prom dress in 2 months. Further, banking interface 600 may be customizable by the account holder. In one example, an account holder may change the placement of option buttons, choose a background and/or a skin for the interface, select music to be played and the like.

According to one or more aspects, a parent or guardian may also access banking interface 600 and make certain modifications. Thus, if a parent or guardian disapproves of the account holder's background or arrangement of option buttons, the parent or guardian may login and change the background and button arrangement accordingly. A parent or guardian may further have access to options that the account holder might not have access to such as modification of the control settings. In one or more configurations, the parent or guardian may be presented with a different banking interface that includes different options than those of banking interface 600.

Figure 7:
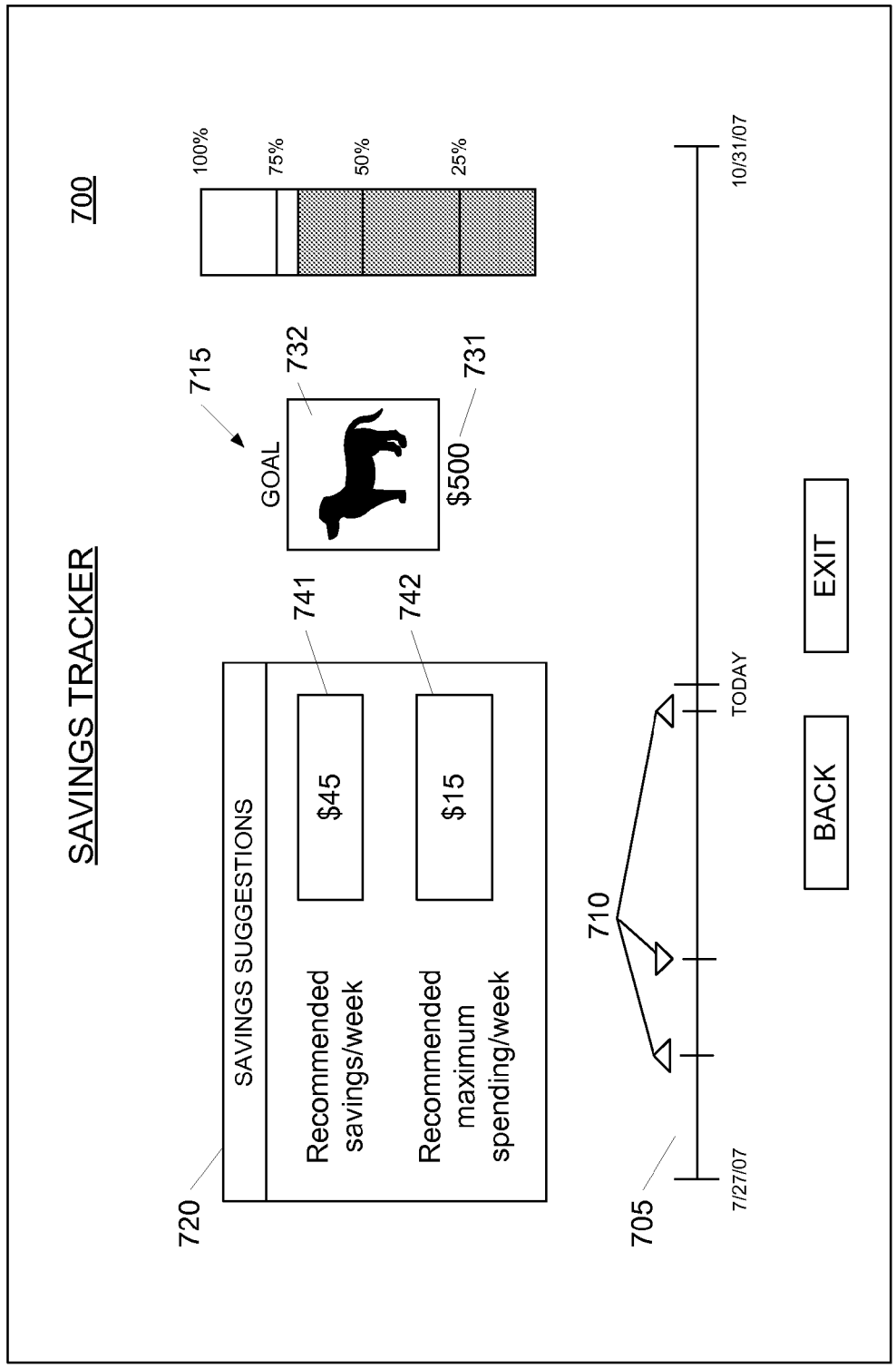
FIG. 7 illustrates a savings tracker interface according to one or more aspects described herein.

FIG. 7 illustrates a savings tracker interface for tracking and monitoring an account holder's savings and account activity. Savings tracker interface 700 includes timeline 705 showing an amount of past and future time, activity indicators 710, goal information 715 and suggestion box 720. Timeline 705 may show a period of time that is defined by a variety of factors including user preference, a time specified as part of a goal and the like. Thus, if a goal was to have enough funds for a birthday party in 2 weeks, the timeline might display at least the 2 weeks between the current date and the date of the birthday party. The timeline may be configured in a horizontal fashion or in a vertical manner. Other arrangements may also be used to display timeline 705. An amount of past time may also be displayed on the timeline to illustrate historical activity (e.g., spending, saving, etc.). Activity indicators 710 may be used to identify points on timeline 705 when a particular activity (e.g., a deposit, a withdrawal, etc.) took place. Indicators 710 may include any shape, color and/or appearance and may provide further information about a corresponding activity upon a user selecting, hovering over or otherwise interacting with the indicator.

Goal information 715 includes data collected about a certain account holder goal. Goal information 715 may include a goal amount 731 and a goal item 732. By entering this information, a banking system may determine suggestions or a savings plan to help the account holder reach the goal within the specified time frame. For example, the banking system may display, in suggestion box 720, a weekly savings amount 741 and a maximum weekly spending amount 742. The weekly savings amount 741 may be calculated based on the amount needed to reach the goal and the current balance. The weekly savings amount 741 may further take into account an average amount spent (e.g., on a weekly, daily or monthly basis) based on historical spending data. A maximum weekly spending allowance 742 may specify the suggested maximum amount of funds an account holder should spend on a weekly basis to be able to reach the goal. The allowance 742 may be built into (i.e., compensated by) the savings amount calculation.

Figure 8:
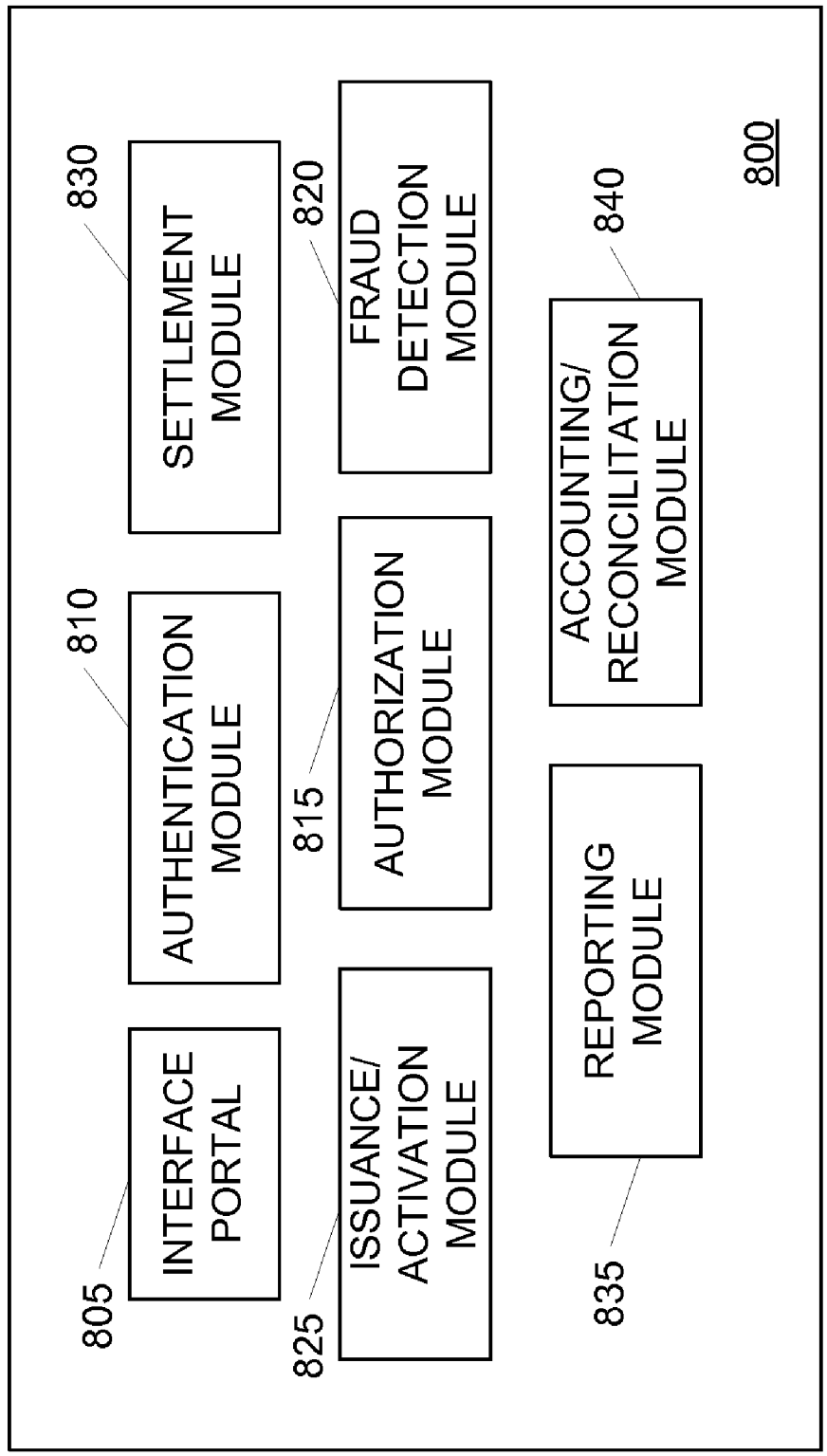
FIG. 8 illustrates a block diagram of a transaction processing system according to one or more aspects described herein.

FIG. 8 illustrates a block diagram of a transaction processing system according to one or more aspects. Transaction processing system 800 may include a variety of components including a user interface portal 805, authentication module 810, authorization module 815, fraud detection module 820, device issuance/activation module 825, settlement module 830, reporting module 835 and accounting/reconciliation module 840. User interface portal 805 may be configured to generate and display a banking or transaction interface to a user. User interface portal 805 may generate and display different interfaces depending on whether an account holder is accessing the information or if the account is being accessed by a parent or guardian of the account holder. Authentication module 810 may be used to validate various types of information such as login name and passwords, PIN numbers, payment device numbers, personal information and the like. Authorization module 815, on the other hand, may be configured to authorize a requested transaction. Authorization may be evaluated based on an account balance, one or more control settings and/or a level of trust of a third party involved in the transaction. Fraud detection module 820 may be configured to determine whether a transaction or recent activity is indicative of fraud. Fraud may be detected in a variety of ways including comparing recent levels of activity (e.g., spending) with historical levels. Device issuance/activation module 825 may be configured to issue new payment device numbers and link accounts to payment devices. Device issuance/activation module 825 may also control the activation of the payment device.

Settlement module 830 may be configured to complete the transfer of funds to and/or from an account. Thus, even if a transaction is initially authorized, the transaction might not be fully settled or completed until the funds are finally received by the receiving entity. Reporting module 835 may be configured to report various activities to various entities such as the account holder (e.g., by way of a statement), a parent or guardian of the account holder, a bank accounting system (e.g., account module 850) and the like. Accounting/reconciliation module 840 may be configured to audit bank activities and to make sure all accounts are reconciled. For example, an entity may wish to determine that the appropriate amount of funds have flowed in and out of the entity within a period of time. Alternatively or additionally, reporting module 835 may be configured to alert an entity if funds have not been received within a specified period of time.

In one or more embodiments, multiple payment devices may be associated with the same funding account. In such instances, the payment devices may have different or the same device number. If the payment devices have different device numbers, different controls may be set for each device number. Alternatively, the payment devices may have the same device number but each have a different PIN, different controls may be set for each particular PIN. According to another aspect, a single payment device may be associated with two different PINs. Thus, each PIN may be associated with different control settings. For example, one PIN may be for a parent or guardian while another PIN may be assigned to a minor.

While the aspects described herein relate generally to minors and the issuance of controlled payment devices to such minors, payment devices having spending controls associated therewith may also be issued to non-minors. In one or more arrangements, account controls may be modified/set by a primary account holder. For example, in instances where two individuals jointly open an account, one of the two individuals may have primary responsibility for the rights and obligations associated with the account. Thus, the primary account holder may be able to control the spending and transactions of the secondary account holder. Thus, the primary account holder might not be a parent or guardian, but instead, may be an uncle or a husband or wife.

Additionally, the methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disk storage, magnetic cassettes, magnetic tape, magnetic storage and the like.

While illustrative systems and methods as described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

I claim:

1. A method comprising:
   receiving, by a payment device issuing system, a user request for a physical debit payment device;
   creating, by the payment device issuing system, the requested physical debit payment device including storing a plurality of identification numbers on the physical debit payment device;
   linking, by the payment device issuing system, the physical debit payment device to a debit funding account, the funding account including existing funds and corresponding to an account identifier different from the plurality of identification numbers;
   determining, by the payment device issuing system, whether the physical debit payment device is being established for an individual under a specified age; and
   in response to determining that the physical debit payment device is being established for an individual under the specified age, requiring, by the payment device issuing system, at least one spending control for the physical debit payment device;
   in response to the requiring, receiving at least one spending control by the payment device issuing system;
   establishing, by the payment device issuing system, a first set of one or more user-specified spending controls for a first identification number of the requested physical debit payment device; and
   establishing, by the payment device issuing system, a second set of one or more user-specified spending controls, different from the first set of one or more user-specified spending controls, for a second identification number of the requested physical debit payment device.

2. The method of claim 1, wherein the request for the payment device is for an individual under the age of majority.

3. The method of claim 2, wherein the payment device is a debit card and the funding account is a savings account.

4. The method of claim 3, wherein the first set of one or more user-specified spending controls are specified by a parent or guardian of the individual.

5. The method of claim 1, wherein establishing the first set of one or more user-specified spending controls includes specifying one or more permissible types of transactions.

6. The method of claim 1, further comprising storing the first set of one or more user-specified spending controls in a storage medium of the payment device.

7. The method of claim 1, wherein the first set of one or more user-specified spending controls are stored in a database in association with at least one of: the funding account and a device number of the payment device.

* * * * *